(12) United States Patent
Thompkins

(10) Patent No.: US 11,345,435 B2
(45) Date of Patent: May 31, 2022

(54) RACK DRIVEN HUMAN POWERED VEHICLE

(71) Applicant: Torek Thompkins, Casselberry, FL (US)

(72) Inventor: Torek Thompkins, Casselberry, FL (US)

( * ) Notice: Subject to any disclaimer, the term of this patent is extended or adjusted under 35 U.S.C. 154(b) by 84 days.

(21) Appl. No.: 17/007,671

(22) Filed: Aug. 31, 2020

(65) Prior Publication Data

US 2022/0063756 A1 Mar. 3, 2022

(51) Int. Cl.
| | |
|---|---|
| *B62M 1/30* | (2013.01) |
| *B62M 23/00* | (2006.01) |
| *A61G 5/02* | (2006.01) |
| *B62K 21/12* | (2006.01) |
| *B62L 3/02* | (2006.01) |

(52) U.S. Cl.
CPC .............. *B62M 1/30* (2013.01); *A61G 5/023* (2013.01); *A61G 5/024* (2013.01); *B62K 21/12* (2013.01); *B62L 3/02* (2013.01); *B62M 23/00* (2013.01)

(58) Field of Classification Search
CPC ................................ A61G 5/024; B62M 1/30
USPC ........................................................ 280/254
See application file for complete search history.

(56) References Cited

U.S. PATENT DOCUMENTS

| 5,007,655 A | 4/1991 | Hanna |
| 10,548,785 B2 * | 2/2020 | Vermij ............... A61G 5/025 |
| 2015/0028560 A1 | 1/2015 | Goin |

FOREIGN PATENT DOCUMENTS

| AU | 2010201876 A1 * | 6/2010 | ............. B62M 1/24 |
| FR | 525376 | 6/1921 | |
| KR | 20090132105 | 12/2009 | |
| WO | 2017024415 A1 | 2/2017 | |
| WO | WO2017024415 A1 | 2/2017 | |
| WO | WO2018191359 | 10/2018 | |

OTHER PUBLICATIONS

European Extended Search Report Jan. 2, 2022.

* cited by examiner

*Primary Examiner* — Minnah L Seoh
*Assistant Examiner* — Hosam Shabara
(74) *Attorney, Agent, or Firm* — Kirby Drake

(57) ABSTRACT

A rack driven human powered vehicle utilizes a rack and pinion system to provide a more efficient method of propulsion. The rack and pinion system may take the linear momentum of at least one driving rack and may transfer it to rotational momentum for at least one freewheel sprocket which may turn the wheel providing momentum for the vehicle.

19 Claims, 6 Drawing Sheets

RACK DRIVEN HUMAN POWERED VEHICLE

FIELD OF THE DISCLOSURE

The present disclosure generally relates to vehicles, and more particularly to rack powered human powered vehicles.

BACKGROUND

Modern bikes use pedals to rotate wheels using a chain and gear system. The chain and gear system includes pedals attached to an axis with at least one gear. There is a larger gear that is connected to the back wheel of the bike. These two gears are connected using a chain. As the pedals are pushed, the gears rotate transferring the rotational motion of the pedals through the chain to the gear attached to the wheel, and this rotates the wheel propelling the bike forward. A gear and chain system uses a relatively small group of muscles and utilizes short strokes.

SUMMARY

Embodiments of the present disclosure may provide a rack driven human powered vehicle that may include at least two wheels, at least one rack and pinion system, and at least one user-controlled element. The at least one rack and pinion system may include at least one freewheel sprocket, at least one driving rack, at least one guiderail, and at least one guide block. The at least one freewheel sprocket may have teeth that allow it to be received by the at least one driving rail. The at least one guide block may then be attached to the at least one driving rail. The at least one guide block also may include at least one mounting post. The at least one mounting post may be configured to be received by top and bottom guide tracks of the at least one guiderail so that it can move freely back and forth through the guiderail. The vehicle may be a bike and/or a wheelchair. If the at least one rack and pinion system is being used with a wheelchair as the vehicle, the at least one rack and pinion system may be positioned so that the user of the wheelchair may still control the wheelchair by moving the wheels by hand. The at least one user-controlled element may be a handlebar and/or a pedal. A handlebar may feature handbrakes. Other embodiments of the present disclosure may provide a rack and pinion system that may include two guide blocks.

Other embodiments of the present disclosure provide wheel forks that may be attached to the at least one guiderail. The wheel forks may hold a pin that may allow the at least two wheels to spin. The pin may be attached to the at least one freewheel sprocket that may be configured to allow the at least two wheels to be propelled forward when pushed in one direction. At least one freewheel sprocket may be attached to each of the at least two wheels. The at least one user-controlled element may return the at least one freewheel sprocket to its starting position without propelling the at least two wheels in a wrong direction. The teeth of the at least one freewheel sprocket may run along a track in the at least one driving rack to propel the vehicle. When a user engages the at least one user-controlled element, the at least one guide block may push through the at least one guiderail. The at least one rack and pinion system may transfer the linear motion of the at least one driving rack into rotational motion in the at least one freewheel sprocket. A pin may run through a center of the at least two wheels, and the pin may be attached to the at least one freewheel sprocket. The at least two wheels may include an axel that may be attached to the at least one freewheel sprocket. The at least one driving rack may be connected to the user-controlled element by the at least one guide block, the at least one user-controlled element may be attached to the at least two wheels and the at least one guide block of the at least one rack and pinion system.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Embodiments of the present disclosure may generally provide a rack driven human powered vehicle that may provide at least two wheels, a rack and pinion system, and a user-controlled element. The rack driven human powered vehicle may use the rack and pinion system for a more efficient form of propulsion.

Figure 1:
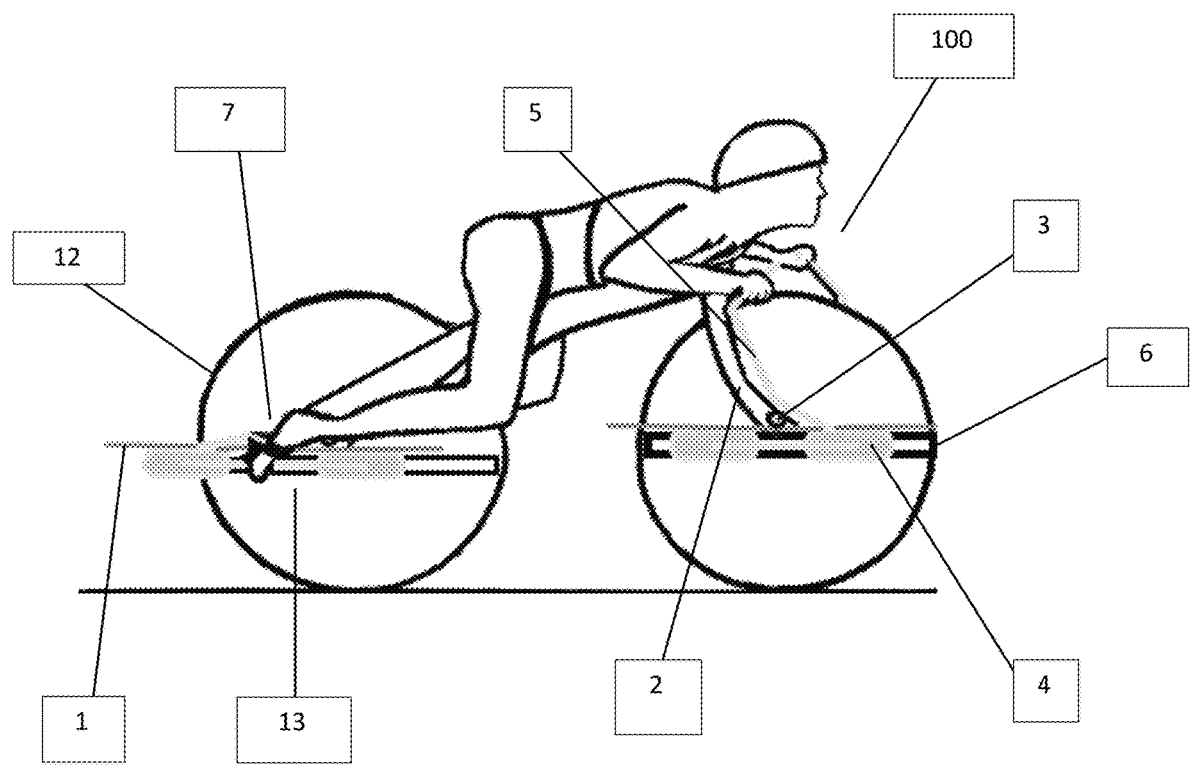
FIG. 1 depicts a side view of a rack driven human powered bike according to an embodiment of the present disclosure.

FIG. 1 depicts a side view of rack driven human powered bike 100 according to an embodiment of the present disclosure. More specifically, FIG. 1 depicts bike 100 with rack and pinion system 13. Stationary guiderails 1 may be attached to wheel forks 2. At least one freewheel sprocket 3 may be attached to the inside of wheel forks 2. The at least one freewheel sprocket 3 may allow pedals 7 to propel bike 100 in one direction but will not affect the rotation of wheels 12 if pedaled in the other direction. There may be at least one freewheel sprocket 3 attached to each wheel 12. At least one guide block 4 may fit into guiderails 1, allowing them to slide back and forth, and also may be attached to a user-controlled element. As depicted in the embodiment in FIG. 1 the user-controlled element may be handlebars 5 and/or pedals 7, depending on the wheel to which the user-controlled element is attached. At least one driving rack 6 may be fixedly attached to at least one guide block 4. When a user engages, such as by pushing, either handlebars 5 or pedals 7, at least one guide block 4 may be moved, which also may move driving rack 6, rotate at least one freewheel sprocket 3, which may rotate wheels 12 and propel bike 100. Using at least one freewheel sprocket 3 may allow handlebars 5 or pedals 7 to be reset to their starting positions without propelling wheels 12 in the wrong direction, thereby negating any progress that was made.

Figure 2:
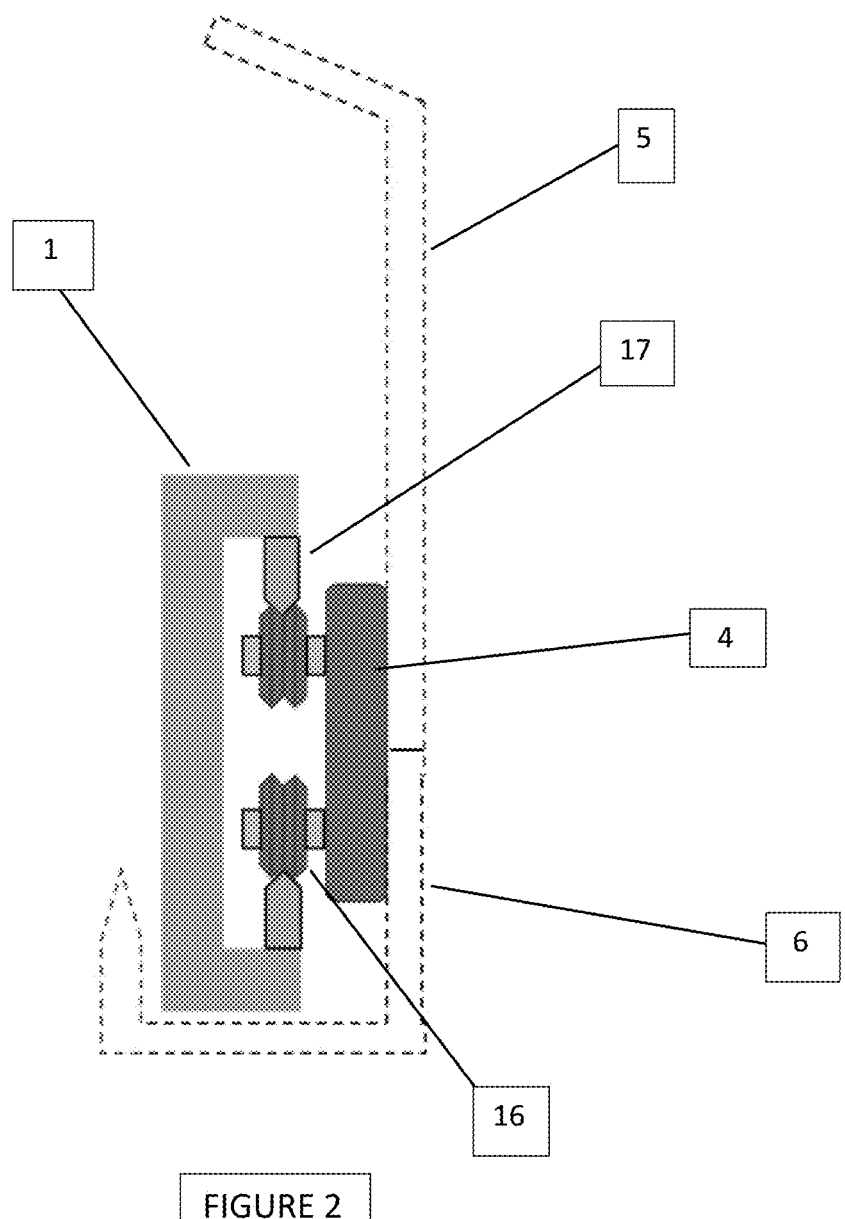
FIG. 2 depicts a close-up view of the rack and pinion system according to an embodiment of the present disclosure.

FIG. 2 depicts a close-up view of the rack and pinion system according to an embodiment of the present disclosure. More specifically, FIG. 2 depicts how at least one guide block 4 may connect to guiderail 1. At least one guide block 4 may include user-controlled element 5 and driving rack 6. An inside portion of at least one guide block 4 may include at least one mounting post 16 that allows it to be attached. At least one mounting post 16 may be gripped by upper and lower guide tracks 17. Guide tracks 17 may be configured to hold at least one mounting post 17 steady while still allowing it to slide back and forth.

Figure 3:
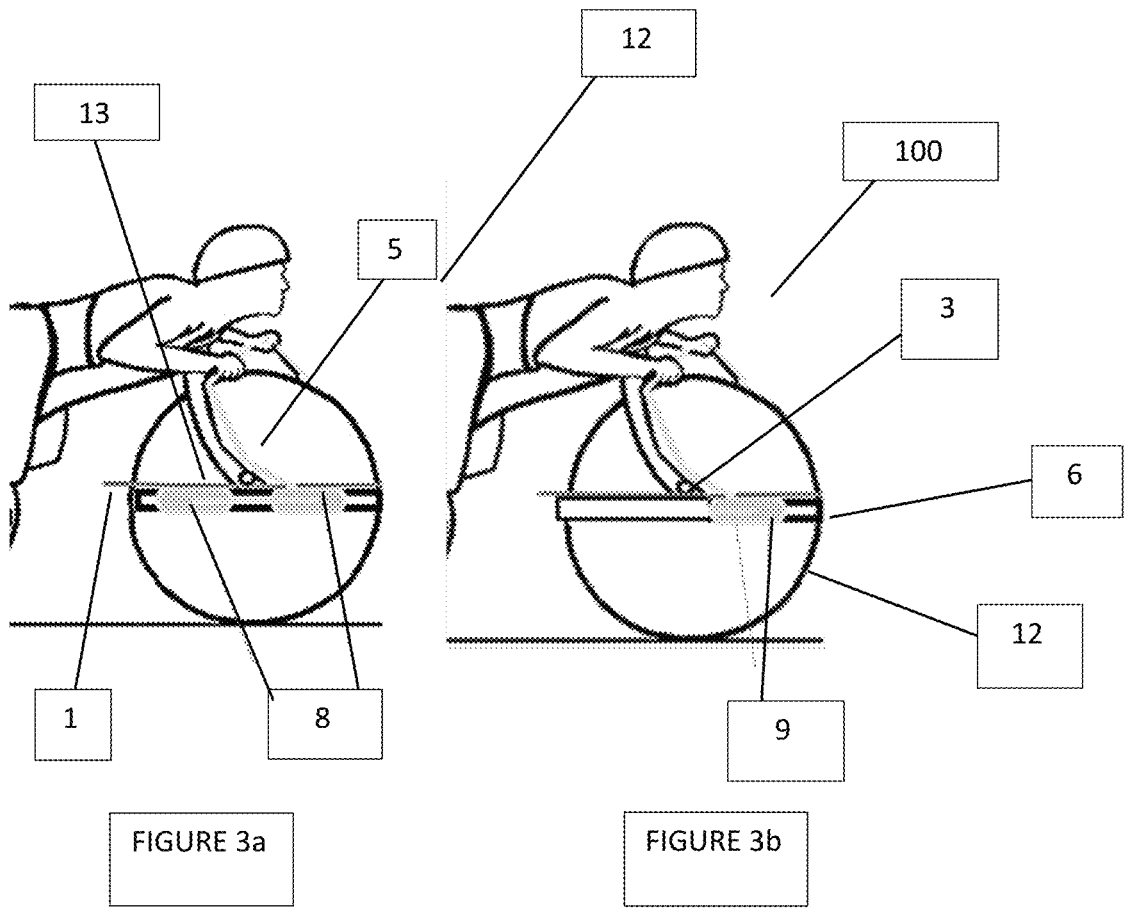
FIG. 3a depicts a two-block version of a bike according to an embodiment of the present disclosure.
FIG. 3b depicts a one-block version of a bike according to an embodiment of the present disclosure.

FIG. 3a depicts a two-block version of a bike according to an embodiment of the present disclosure. More specifically, FIG. 3a depicts bike 100 using two guide blocks 8. In an embodiment of the present disclosure, guide blocks 8 may be blocks of material that may be fixedly attached to driving rack 6. Guide blocks 8 may also be configured to slide into guiderail 1 allowing guide blocks 8 to slide back and forth as they are controlled by the user. Inclusion of two guide blocks 8 may allow the user's weight to be more evenly distributed across driving rack 6 as he/she puts pressure onto it.

FIG. 3b depicts a one-block version of a bike according to an embodiment of the present disclosure. More specifically, FIG. 3b shows another embodiment of bike 100 having one guide block 9, which may function the same and at the same efficiency as bike 100 of FIG. 3a which includes two guide blocks. Bike 100 having guide block 9 as depicted in FIG. 3b may still contain the other features of bike 100 as described in connection with FIG. 1. Guide block 9 may be attached to driving rack 6 which may work with at least one freewheel sprocket 3 to rotate wheel 12 and may propel bike 100 forward.

Figure 4:
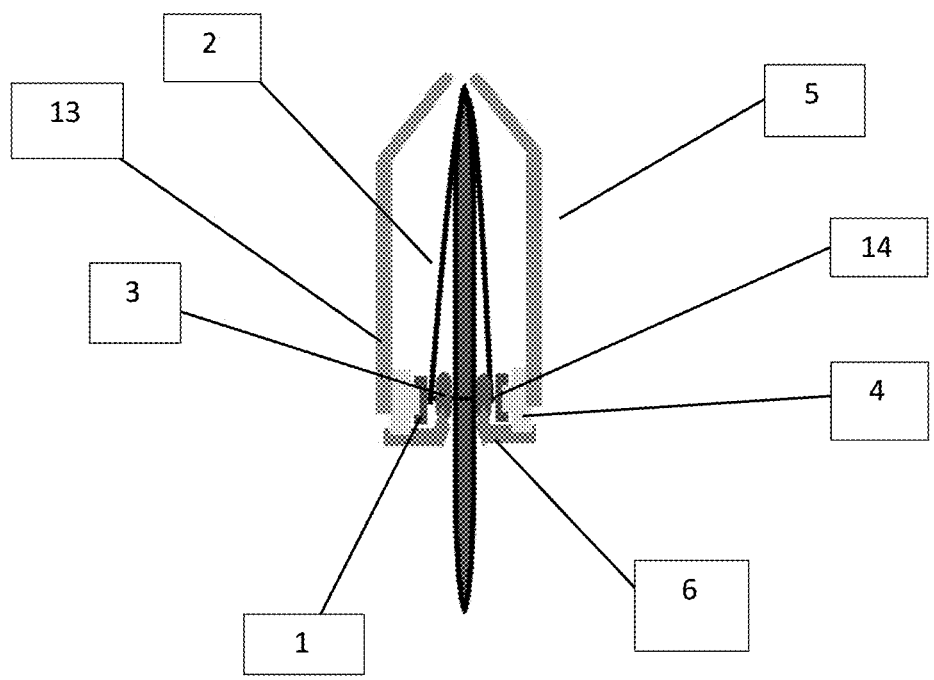
FIG. 4 depicts a front view of a rack driven human powered bike according to an embodiment of the present disclosure.

FIG. 4 depicts a front view of a rack driven human powered bike according to an embodiment of the present disclosure. More specifically, FIG. 4 shows a front facing view of how the different components may fit together to make rack and pinion system 13 work. Wheel fork 2 may be connected to the body of bike 100 and may hold pin 14 that may allow wheel 12 to spin. Attached to pin 14 is at least one freewheel sprocket 3 that may allow wheel 12 to be propelled forward when pushed one direction. The at least one freewheel sprocket 3 may work to allow wheel 12 to be propelled forward but then reset in the other direction without affecting the momentum or direction of wheel 12. The teeth on the bottom of the at least one freewheel sprocket 3 may run along the track in driving rack 6, to create rack and pinion system 13 that may propel bike 100. Driving rack 6 may be attached to at least one guide block 4. At least one guide block 4 may fit into and may be configured to slide along guiderails 1. At least one guide block 4 may move because it may be attached to user-controlled element 5. User controlled element 5 in the embodiment may be handlebars and/or pedals, depending to which wheel they are attached. When a user engages or moves user-controlled element 5, this may push at least one guide block 4 through guiderail 1. Since at least one guide block 4 may be attached to driving rack 6, this may be moved as well. The gear teeth on driving rack 6 may turn at least one freewheel sprocket 3 as it is moved. As the driving rack 6 moves at least one freewheel sprocket 3, rack and pinion system 13 may be created. Rack and pinion system 13 may transfer the linear motion of driving rack 6 into rotational motion in at least one freewheel sprocket 3. This transference of motion allows for more of the energy and motion of the user to be directly transferred into the rotation of wheels 12 creating a more efficient system than in a traditional bike. If driving rack 6 is being moved in one direction, this may rotate wheel 12 of bike 100 as at least one freewheel sprocket 3 is being rotated. If driving rack 6 is being moved in the opposite direction, then rotation of freewheel sprocket 3 may not counteract the rotation of wheel 12, which may continue to rotate in the direction it was going.

Figure 5:
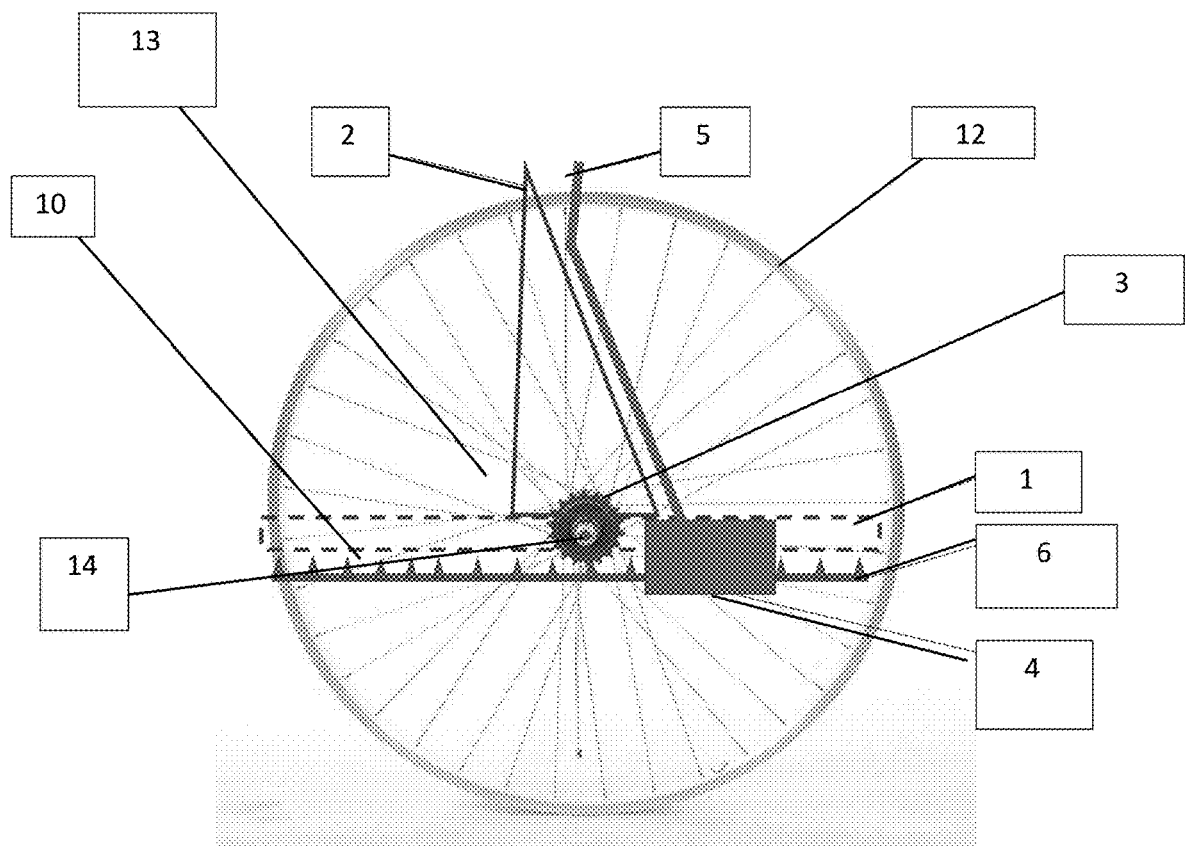
FIG. 5 depicts a side view of one wheel of the bike of FIG. 4 according to an embodiment of the present disclosure.

FIG. 5 depicts a side view of one wheel of the rack driven human powered bike of FIG. 4 according to an embodiment of the present disclosure. More specifically, FIG. 5 depicts a side view of wheel 12 with rack and pinion system 13 attached according to an embodiment of the present disclosure. At least one freewheel sprocket 3 may be attached to pin 14 that runs through the center of wheel 12. The teeth of the at least one sprocket 3 may fit into teeth 10 of driving rack 6 allowing linear movement of driving rack 6 to be transferred to rotational movement of sprocket 3. Driving rack 6 may then be attached to at least one guide block 4. At least one guide block 4 may then also be attached to handlebar 5 and guiderail 1. Guiderail 1 may be configured to have a track with top and bottom guide tracks 17. Guide tracks 17 of guiderail 1 may be configured to receive a portion of at least one guide block 4, with guide tracks 17 keeping at least one guide block 4 on guide tracks 17. Handlebar 5 may be fixed to at least one guide block 4, while at least one guide block 4 and guiderail 1 may be fitted together allowing block 4 to slide back and forth. Guiderail 1 may be attached to wheel fork 2 which may hold pin 14. Wheel fork 2 may attach to the main body of bike 100.

Figure 6A:
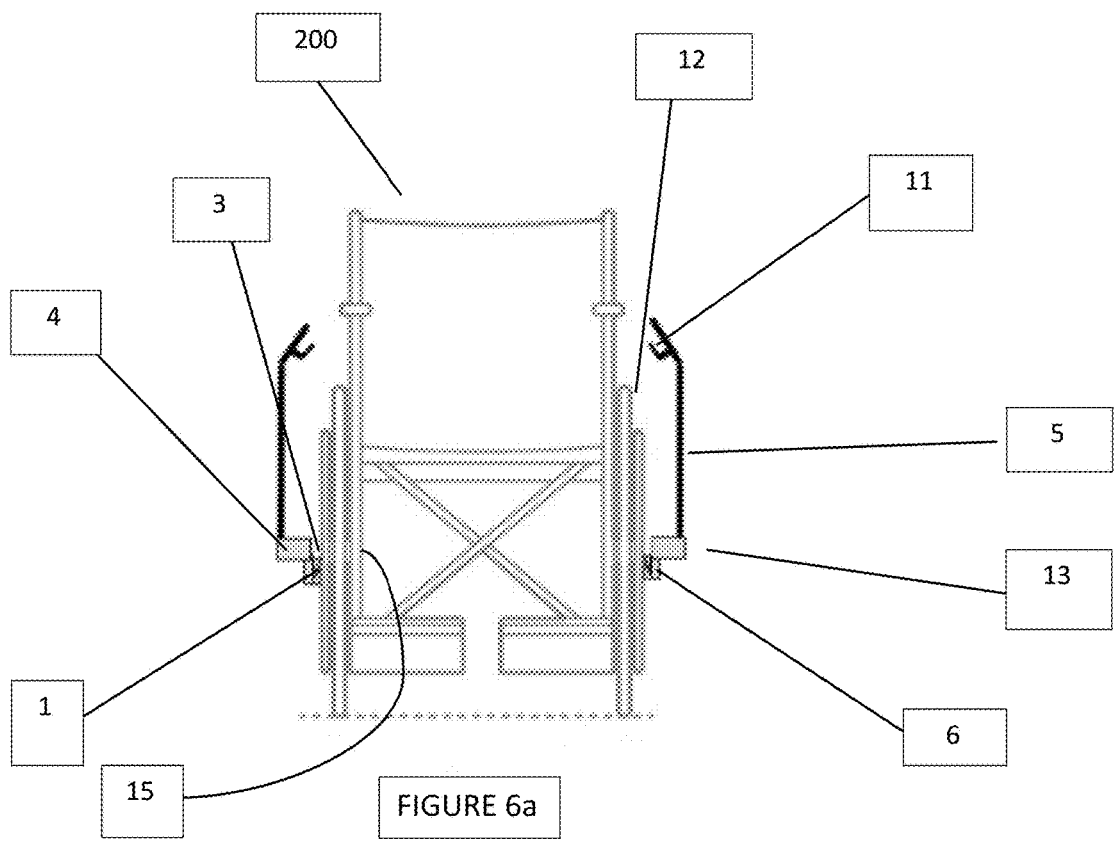
FIG. 6a depicts a front view of a rack driven human powered wheelchair according to an embodiment of the present disclosure.

FIG. 6a depicts a front view of rack driven human powered wheelchair 200 according to an embodiment of the present disclosure. More specifically, FIG. 6a depicts rack and pinion system 13 as it may be attached to wheelchair system 200 according to an embodiment of the present disclosure. Wheelchair 200 may allow wheels 12 to still be moved in the conventional method by moving wheels 12 by hand if that is needed. At least one freewheel sprocket 3 may be attached to axel 15 of wheel 12. The teeth of at least one sprocket 3 may fit into driving rack 6 which may allow them to function as a rack and pinion system. Driving rack 6 may be attached to at least one guide block 4 which may then be attached to handlebars 5. Handlebars 5 may also feature hand brakes 11 which may allow the user to make turns and stops. At least one guide block 4 may be fitted into guiderail 1 that may allow at least one guide block 4 to move smoothly and not fall off track. When the user pulls handlebars 5 back, at least one guide block 4 may move driving rack 6 which then may rotate at least one freewheel sprocket 3, which may rotate wheel 12 forward. Pushing handlebars 5 forward may move wheelchair system 200 but freewheel sprocket 3 may not affect the rotation of wheels 12 and allow drive rack 6 to reset.

Figure 6B:
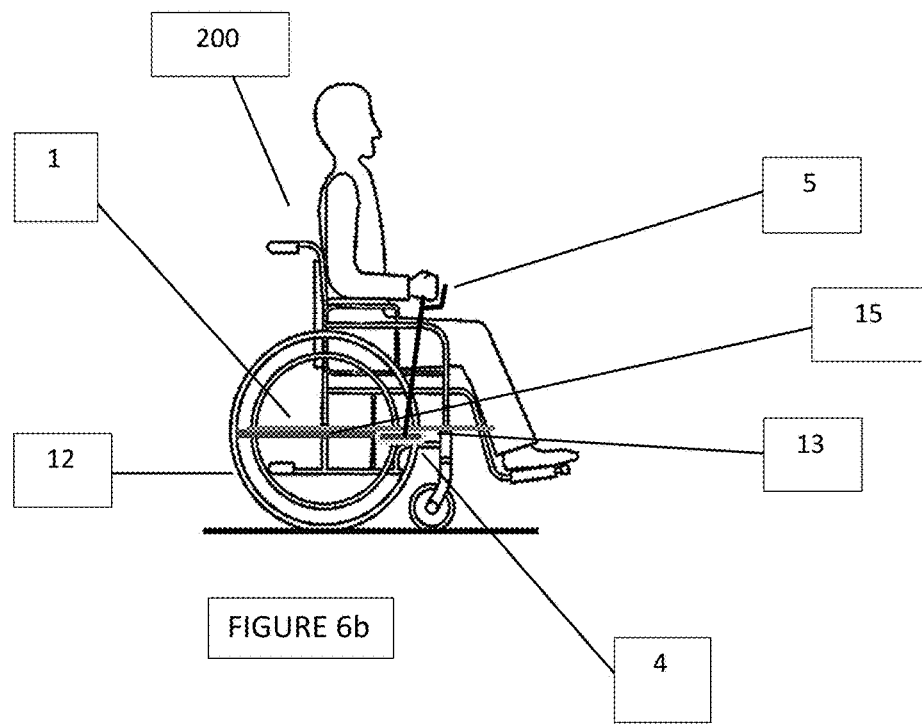
FIG. 6b depicts a side view of the wheelchair of FIG. 6a according to an embodiment of the present disclosure.

FIG. 6b depicts a side view of the wheelchair of FIG. 6a according to an embodiment of the present disclosure. More specifically, FIG. 6b shows a side view of wheelchair system 200 with rack and pinion system 13 according to an embodiment of the present disclosure. This side view depicts how handlebars 5 may connect to at least one guide block 4 which may then be fit into and may be able to slide back and forth along guiderail 1. FIG. 6b also shows how guiderail 1 may be attached to wheels 12, which may allow rack and pinion system 13 to function and propel wheelchair 200 forward.

The vehicle depicted in the figures has been described as a bike or wheelchair, but it should be appreciated that the system may be used on connection with types of other vehicles. In the present embodiments, while the vehicle is depicted as having a rack and pinion system including two freewheel sprockets, but it should be appreciated that more or fewer freewheel sprockets may be used without departing from the present disclosure. The vehicles depicted in the figures have been described as using at least two wheels, but it should be appreciated that a vehicle with this system may use more or fewer wheels without departing from the present disclosure. Similarly, embodiments have been described as including one or two guide blocks; however, it should be appreciated that there may be embodiments of the present disclosure that may use more than two guide blocks. In addition, while the user-controlled element has been described as handlebars or brakes, it should be appreciated that other user-controlled elements may be used without departing from the present disclosure.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A rack driven human powered vehicle comprising:
   at least two wheels;
   at least one rack and pinion system comprising:
      at least one freewheel sprocket having teeth;
      at least one driving rack configured to receive the teeth of the at least one freewheel sprocket;
      at least one guide block fixedly attached to the at least one driving rack, the at least one guide block having at least one mounting post; and
      at least one guiderail configured to receive the at least one guide block, wherein the guiderail has upper and lower guide tracks that are configured to receive the at least one mounting post, and are configured to allow the at least one mounting post free movement back and forth; and
   at least one user-controlled element attached to the at least two wheels and the at least one guide block of the at least one rack and pinion system.

2. The vehicle of claim 1, wherein the vehicle is a bike.

3. The vehicle of claim 1, wherein the vehicle is a wheelchair.

4. The vehicle of claim 3, wherein the rack and pinion system is positioned to allow the user access to control the at least two wheels by hand.

5. The vehicle of claim 1, where the at least one user-controlled element is handlebars.

6. The vehicle of claim 5 further comprising handbrakes fitted to the handlebars.

7. The vehicle of claim 1, where the at least one user-controlled element is pedals.

8. The vehicle of claim 1, wherein the rack and pinion system comprises two guide blocks.

9. The vehicle of claim 1 further comprising:
   wheel forks attached to the at least one guiderail.

10. The vehicle of claim 9, wherein the wheel forks hold a pin that allows the at least two wheels to spin.

11. The vehicle of claim 10, wherein the pin is attached to the at least one freewheel sprocket that is configured to allow the at least two wheels to be propelled forward when pushed in one direction.

12. The vehicle of claim 1, wherein there is at least one freewheel sprocket attached to each of the at least two wheels.

13. The vehicle of claim 1, wherein the at least one user controlled element returns the at least one freewheel sprocket to its starting position without propelling the at least two wheels in a wrong direction.

14. The vehicle of claim 1, wherein the teeth of the at least one freewheel sprocket run along a track in the at least one driving rack to propel the vehicle.

15. The vehicle of claim 1, wherein when a user engages the at least one user-controlled element, the at least one guide block pushes through the at least one guiderail.

16. The vehicle of claim 1, wherein the rack and pinion system transfers linear motion of the at least one driving rack into rotational motion in the at least one freewheel sprocket.

17. The vehicle of claim 1 further comprising:
   a pin that runs through a center of the at least two wheels, the pin attached to the at least one freewheel sprocket.

18. The vehicle of claim 1, the at least two wheels further comprising:
   an axel attached to the at least one freewheel sprocket.

19. The vehicle of claim 1, wherein the at least one driving rack is connected to the at least one user-controlled element by the at least one guide block, the at least one user-controlled element attached to the at least two wheels and the at least one guide block of the at least one rack and pinion system.

* * * * *